United States Patent
Gleixner et al.

[11] Patent Number: 6,031,380
[45] Date of Patent: Feb. 29, 2000

[54] METHOD AND DEVICE FOR DETERMINING THE RESPECTIVE GEOMETRICAL POSITION OF A BODY BY CAPACITIVE SENSING

[75] Inventors: Franz Gleixner, Röhrmoos; Rainer Utz, Ostfildern; Dieter Bächle, Weil im Schönbuch, all of Germany

[73] Assignee: Horst Siedle GmbH & Co. KG., Furtwangen, Germany

[21] Appl. No.: 08/760,698

[22] Filed: Dec. 5, 1996

Related U.S. Application Data

[63] Continuation of application No. 08/429,250, Apr. 25, 1995, abandoned.

[30] Foreign Application Priority Data

Nov. 10, 1994 [DE] Germany .............................. 44 40 067
Dec. 30, 1994 [DE] Germany .............................. 44 47 295

[51] Int. Cl.[7] .................................................. G01R 27/26
[52] U.S. Cl. ...................................... 324/683; 324/370.38
[58] Field of Search ..................................... 324/683, 713, 324/715, 725; 340/807.37, 870.38

[56] References Cited

U.S. PATENT DOCUMENTS

| | | | |
|---|---|---|---|
| 3,296,522 | 1/1967 | Wolfendale | 340/870.37 |
| 4,290,065 | 9/1981 | Gleason | 340/840.38 |
| 4,420,754 | 12/1983 | Andermo | 324/683 |
| 4,437,055 | 3/1984 | Meyer | 324/725 |
| 4,694,275 | 9/1987 | Cox | 340/870.37 |
| 4,733,235 | 3/1988 | Baer et al. | 324/682 |
| 4,737,699 | 4/1988 | Wen | 340/870.37 |
| 4,743,902 | 5/1988 | Andermo | 324/683 |
| 4,810,951 | 3/1989 | Meyer | 340/870.37 |
| 5,068,653 | 11/1991 | Klinger et al. | 340/870.37 |
| 5,172,039 | 12/1992 | Owens | 340/870.37 |
| 5,347,875 | 9/1994 | Lew et al. | 340/870.37 |

*Primary Examiner*—Maura Regan
*Attorney, Agent, or Firm*—Darby & Darby

[57] ABSTRACT

For determining the respective geometrical position, the displacement or angle of a body by capacitive sensing, a supply voltage applied to a voltage-distribution element is switched, and/or phase-shifted voltages are applied, in such a way that at least two different distribution patterns of the supply voltage, that follow each other in time, are obtained across the voltage divider.

6 Claims, 6 Drawing Sheets

$j_1 > j_2 > j_3 > j_4 \cdots$

METHOD AND DEVICE FOR DETERMINING THE RESPECTIVE GEOMETRICAL POSITION OF A BODY BY CAPACITIVE SENSING

This is a continuation of application Ser. No. 08/429,250, filed Apr. 25, 1995, now abandoned.

BACKGROUND OF THE INVENTION

The present invention relates to a method and to a device including an evaluation circuit which permits capacitive sensing in connection with displacement, angle or position sensors so as to enable the position of movable bodies to be determined in a no-contact way.

In most of the cases analogue voltage divider circuits are used for this purpose, which are either designed, according to the known potentiometer principle, as displacement encoders, rheostats or potentiometers, or employed in the form of inductors, for example as differential coils, differential transformers, inductors with short-circuit winding in the form of a tube.

In the case of an analogue resistance potentiometer, a deposit applied on a substrate by spraying or by vapor deposition serves as a resistance path on which a wiper slides in contact relation, thereby being put in a position to pick up different direct voltage potentials of the resistance path, depending on its particular position, and to transmit them, via a collector wiper connected with it, to a collector path where the sensed potential is available for evaluation. Such potentiometers, certain embodiments of which can be used with a very high degree of precision as displacement sensors or pick-offs, may under certain conditions lead to problems, due to the constant contact relation which latter finally also leads to wear in the case of rapid wiper movements, so that there exists a real demand for a system that allows no-contact sensing of the corresponding measured values.

If a capacitive position sensor or displacement sensor of the kind known, for example, from DE 28 26 398 C2 is used instead of the inductive measuring systems, which also works in a no-contact way, but involves certain measuring inaccuracies and, under certain circumstances, also non-linearities, then absolutely significant adulterations of the derived measured values must be expected under certain circumstances, due to the influence of stray capacitances and leakage resistances—a circumstance that is not tolerable in most of the cases.

The capacitive displacement sensor described by DE 28 26 398 C2 comprises a pair of obliquely divided, mutually insulated capacitor plates to which an alternating voltage is applied and between which an intermediate plate, serving as a pick-off being adjustable by the length of the path to be picked off, is arranged and connected to the input of an evaluation circuit via a connection cable. The movements of the pick-off lead to constantly varying forces acting on the connection cable and its connection points; these forces not only result in accelerated aging of the displacement sensor, but have the additional effect, especially due to the changes in the position and displacement of the cable, to cause capacitance variations and varying stray capacitances as well as varying leakage resistances, which constitute a disturbance variable that cannot be specified and, above all, that cannot be compensated in this way.

The evaluation circuit of this known displacement sensor comprises an operational amplifier whose one input is connected via the connection cable to the displaceable intermediate plate, which latter serves as pick-off, and to whose other input the feed-back measuring signal is applied via a resistor connected to ground. The output of the operational amplifier is connected, via a rectifier, to other amplifier elements one of which is configured as an emitter follower. As in such evaluation circuits the arising stray capacitances are in the order of the measuring capacitance, and the input resistance of the amplifier is in the range of the sensor impedance, for usual frequencies, a precise and strictly linear output voltage cannot be expected.

In the case of other capacitive displacement sensors, for which the evaluation circuit is not described at all or only in the form of a simple downstream amplifier (DE 34 41 217), a tightly packed resistance path, showing a meander-shaped or zigzag configuration, is supported on a substrate surface, and a displaceable pick-off element, being arranged at a certain distance from that resistance path and designed as a planar annulus, is provided so as to capacitively uncouple the respective potential and supply it via a connection line to a measuring circuit consisting of a voltmeter. The conductor path is, however, connected to a direct-current supply voltage so that capacitive sensing is possible only during a displacement performed at a correspondingly high speed, while stationary detection of a position cannot be effected, due to the then missing measured value. Here again, disturbance variables are similarly encountered, due to stray capacitances and leakage resistances, which cannot be eliminated.

Finally, it has been known in connection with a galvanometer to connect the pointer of the galvanometer, being a movable element, to an alternating voltage connection, with the pointer moving in a plane at a certain distance above a resistor element, whereby a voltage drop is caused in the latter by capacitive coupling, which voltage drop can then be evaluated to derive the pointer position (U.S. Pat. No. 3,636,449).

Now, it is an object of the present invention to provide a capacitance-based no-contact position sensor and to design its evaluation circuit in such a way as to achieve an especially low sensitivity to disturbances, combined with high measuring accuracy.

Advantages of the Invention

The invention achieves this object and provides the advantage that while largely uncritical and low-cost components can be used, the influence of stray capacitances and leakage resistances can be either fully eliminated or in any case maintained at a level that does not influence the desired measuring accuracy in the no-contact measurement of displacements, effected by capacitive coupling.

The invention does not need any costly screening for this purpose as it succeeds in compensating the influence of stray capacitances to ground, and the input resistance of the circuit, by the automatic control of the overall gain and/or the supply of the voltage divider circuit, which preferably is a usual resistance path of the type also used in potentiometer-type displacement sensors. The automatic control is effected in connection with, and altogether tuned to, switching actions performed at different points of the evaluation circuit.

Thus, a first preferred embodiment of the invention is based on an arrangement which differentiates between two phases, by timed interruption of connection lines between the signal source supplying the resistance path, and the resistance path, namely a first phase I in which the full voltage then present over the full length of the resistance path—regardless of the position of the capacitive potential probe scanning its voltage distribution pattern—is picked up by that probe and compared with a reference voltage, and a second measuring phase in which the obtained measured value can be evaluated. During phase I the amplification gain of the measured value, that has been picked up capacitively by the potential probe, is correspondingly balanced and/or the signal source feeding the resistance path at a controllable amplitude is influenced in such a way that any variations occurring during the measuring phase II, when one end of the resistance path is again supplied with the control voltage, are exclusively due to the respective position of the potential probe, based on its displacement, while any other influences due to stray capacitances or leakage resistances are eliminated because they have been compensated before by the change in gain during phase I, i.e. the phase of comparison with the reference voltage. It is of course a precondition for this system that the circuitry components involved show a linear behavior, which condition is fulfilled in the present case.

Such compensation of the interference voltage drop, provoked by stray capacitances and leakage resistances, by automatic control of the overall gain is also possible when that end of the resistance path that is connected to ground is supplied with a opposite-phase voltage during the measuring phase at the other end, so that in this case, too, a voltage drop occurs across the voltage divider path.

According to another embodiment of the invention it is further possible to supply the voltage divider with an alternating voltage in such a way that, alternately, one end is connected to an alternating voltage, while the other end is connected to ground. This has the effect that the voltage appearing at the output represents alternately the voltage divider ratio or its difference to one. When the gain is then controlled in such a way that the sum of those values corresponds to the reference voltage, then one obtains two oppositely directed output voltages representative of the voltage divider ratio, i.e. the desired measured value, and the reference voltage, respectively.

The further features specified in the subclaims permit further developments and improvements of the invention.

BRIEF DESCRIPTION OF THE DRAWING

Certain embodiments of the invention will be described hereafter with reference to the drawing in which.

DESCRIPTION OF THE EMBODIMENTS

The basic idea of the invention is to provide an evaluation circuit for a capacitance-based position sensor that is capable of reliably compensating the leakage and fault currents occurring in capacitor areas and on conductor paths, and of giving in this way a position sensor of this type a degree of accuracy that was not achievable before so that a novel concept of decisive technical importance is achieved in combination with the known advantages of a sensor operating on a capacitive basis, namely no-contact operation, resistance to aging, and the like. Compensation is effected by switching over the alternating supply voltage at the voltage divider element, which latter is scanned by the potential measuring probe and which usually consists of a resistance path, so that in addition to measuring phases comparison phases and balancing phases are obtained which act with retroactive effect either on the alternating voltage supply of the resistance element or on amplifiers in the evaluation area so as to eliminate the influence of the disturbance variables.

In this connection, a great number of exemplary embodiments are possible, which will be explained in more detail below, although the mechanical/electrical structure of the capacitance-based position sensor is preferably configured in the way that will be described initially with reference to the representation of FIG. 1. This description is also meant to improve the understanding of the invention, a structure of the type illustrated diagrammatically in FIG. 1 being especially well suited to considerably further the desired freeness of the sensor from disturbance variables and, insofar, to render the respective evaluation circuits especially effective.

Figure 1:
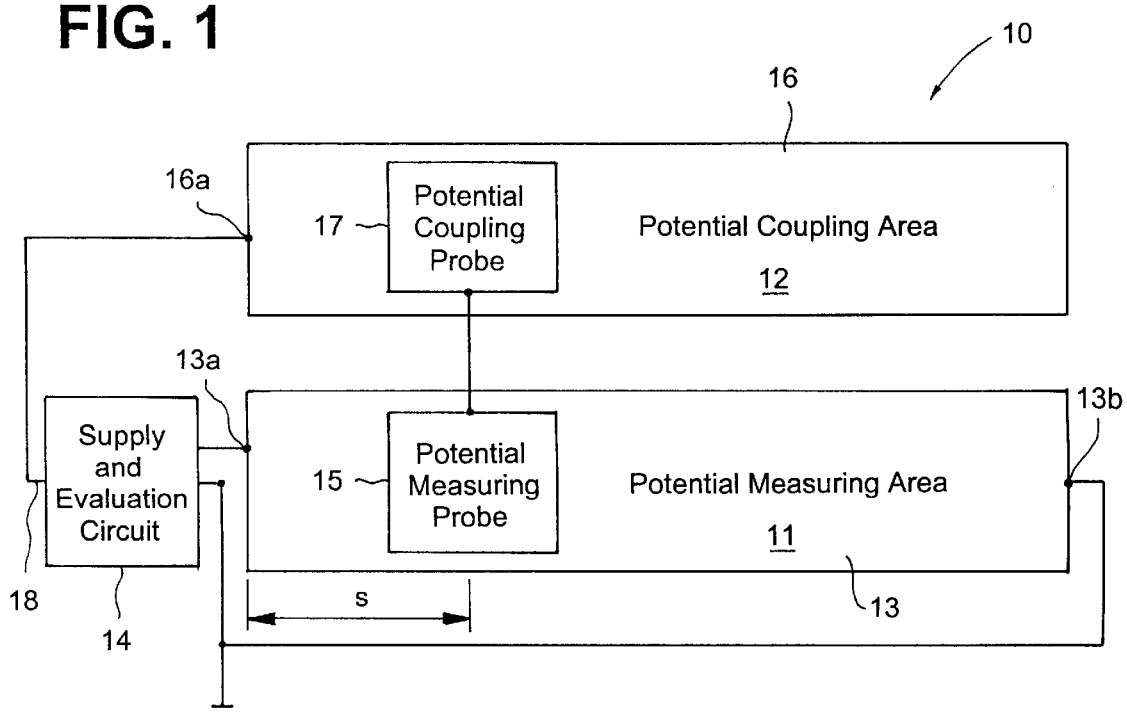
FIG. 1 shows a highly diagrammatic representation of the mechanical/constructional design of a preferred capacitive displacement sensor with measuring and coupling capacitor arrangement, as one possible embodiment of the invention.

The capacitance-based position sensor 10, as illustrated in FIG. 1, comprises a potential measuring area 11 and a potential coupling area 12, the potential measuring area being, in the case of this embodiment, a real voltage divider element 13 with smooth voltage characteristic, for example and preferably a resistance path of the type commonly used in potentiometer-based pick-offs (in which case they are supplied with direct current) or in rotary potentiometers.

The two connections 13a, 13b of the resistance path of the voltage divider is supplied in this case—via a supply and evaluation circuit 14 that will be described in more detail later, in connection with other embodiments of the invention—with an alternating voltage of constant, maybe also controllable amplitude, and in the case of the illustrated embodiment one of the connections, for example the connection 13b, is connected to ground so that it can be seen very clearly that a distribution of the alternating voltage dropping in amplitude from the connection point 13a to the connection point 13b is obtained across the resistance path of the voltage divider.

The resistance path of the voltage divider 13 is of the no-contact type, which means that a potential measuring probe 15 is assigned to it at a predetermined spacing, which thereby capacitively interacts with the resistance path, being thus also capable of tapping the alternating voltage potential across the resistance path, that varies across the distance s (in the measuring direction), the potential measuring probe 15, designed in this case as rectangular plate, having an integrating or averaging effect and tapping at any time that alternating voltage amplitude that results as mean value from the position of the potential measuring probe.

The potential measuring area 11 and the potential coupling area 12 are electrically isolated one from the other in a suitable way, the potential coupling area 12 comprising also a movable probe portion, namely a potential coupling probe 17, which moves at a predetermined distance, i.e. likewise in a no-contact way, across the altogether electrically conductive electrode surface 16 of the potential coupling area 12, in synchronism with the potential measuring probe. The respective, in this case rectangular, surfaces of the potential measuring probe and the potential coupling probe are connected one to the other at least electrically, but preferably also through their mechanical structure, so as to form a common component, for example a double copper plate arrangement, for being jointly displaced by a suitable support, not show, across the associated surfaces of the resistance path or the coupling electrode surface, in the measuring direction.

The respective surfaces of the potential measuring probe 15 and the potential coupling probe 17 form together with the respective counter-surfaces of the resistance path and the electrode 16, respectively, capacitors that are designated, in the subsequent evaluation circuits, as measuring capacitor $C_M$ and/or as coupling capacitor $C_K$, respectively, and whose capacitance remains almost unchanged across the displacement path so that the generation of the measured value is not influenced by capacitance variations.

Thus, the potential coupling probe 17 transmits the alternating-current voltage amplitude-measuring signal tapped at the potential measuring probe 15 capacitively and correctly to the electrode surface 16 of the potential coupling area 12, there being only one additional connection 16a which does not change its position and at which the voltage amplitude signal reaches the input 18 of the supply/evaluation circuit 14.

Figure 2:
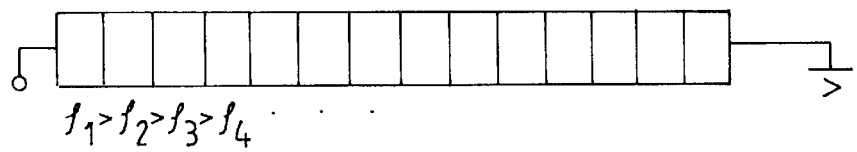
FIG. 2 shows a diagram of a potential distribution over a voltage distribution element, designed as a resistance path, which is scanned by a potential measuring probe.

The theoretical/physical mechanism is such that when an alternating current is applied, the potential distribution obtained on the "potentiometer" resistance path according to the representation of FIG. 2 can be defined by the following formula:

$$\text{Potential } \rho = -\vec{E} \cdot \vec{x}$$

or expressed as electric field distribution $$\text{field: } \vec{E} = -\text{grad}\rho$$

where, $$\rho_1 > \rho_2 > \rho_3 > \rho_4 > \ldots$$

is as appears from FIG. 2.

Figure 3:
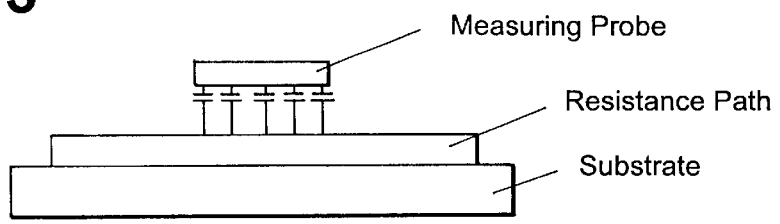
FIG. 3 shows an illustration of the capacitive relationship between the potential measuring probe and the resistance path.

The voltage being an alternating voltage, the potential may be represented as follows:
$\rho = \rho_0 \cdot \sin[\sin(\omega \cdot t)]$ where
o=amplitude of the potential
$\omega$=angular frequency $2\pi\nu$
$\nu$=frequency
t=time The whole system can be perceived as a capacitor composed of a number of small capacitors, as represented in more detail in FIG. 3.

The capacitor equation reads as follows:

$$C = \epsilon r \cdot \epsilon o \cdot A/d,$$

wherein

C: capacitance
$\epsilon r$: relative dielectric constant
A: capacitor surface
d: distance (of the plates)

The capacitance is defined as follows:

$$C = \sum_{i=1}^{n} Ci = \varepsilon o \cdot \varepsilon r \cdot \sum_{i=1}^{n} \cdot \frac{Ai}{di}$$

As to the capacitances, the following is to apply:

$$\Delta C1 \stackrel{!}{=} \Delta Cn$$

$$\Delta C2 \stackrel{!}{=} \Delta Cn - 1$$

$$\Delta C3 \stackrel{!}{=} \Delta Cn - 2$$

. .
. .
. .

The tapped potential is linearly related to the locus x. $\rightarrow \rho = \rho(x)$. Through the element capacitances $\equiv Ci$, displacement currents $I_1$ flow into the probe according to the following formula:

$$I_i = Ci \cdot \frac{d\,i(x)}{dt}$$

The overall displacement current I is then equal to:

$$I = \sum_{i=1}^{n} Ci \cdot \frac{d\,i(x)}{dt}$$

which means that the individual voltage amplitudes are added up to an overall displacement current I.

Accordingly, even the smallest displacements of the plate of the potential measuring probe are integrated into the tapped alternating voltage amplitude as the ratio of the partial voltages naturally changes when a displacement by $\delta$s takes place. Picking up the measuring signal is effected in a no-contact way, as is the transmission to the stationary electrode surface 16, so that such a position sensor is not subjected to any mechanical wear and all disturbance variables, such as variable stray capacitances, which may otherwise be produced by as little as bent connection lines, or contact resistances of sliding contacts, are excluded already at this point.

Figure 4:
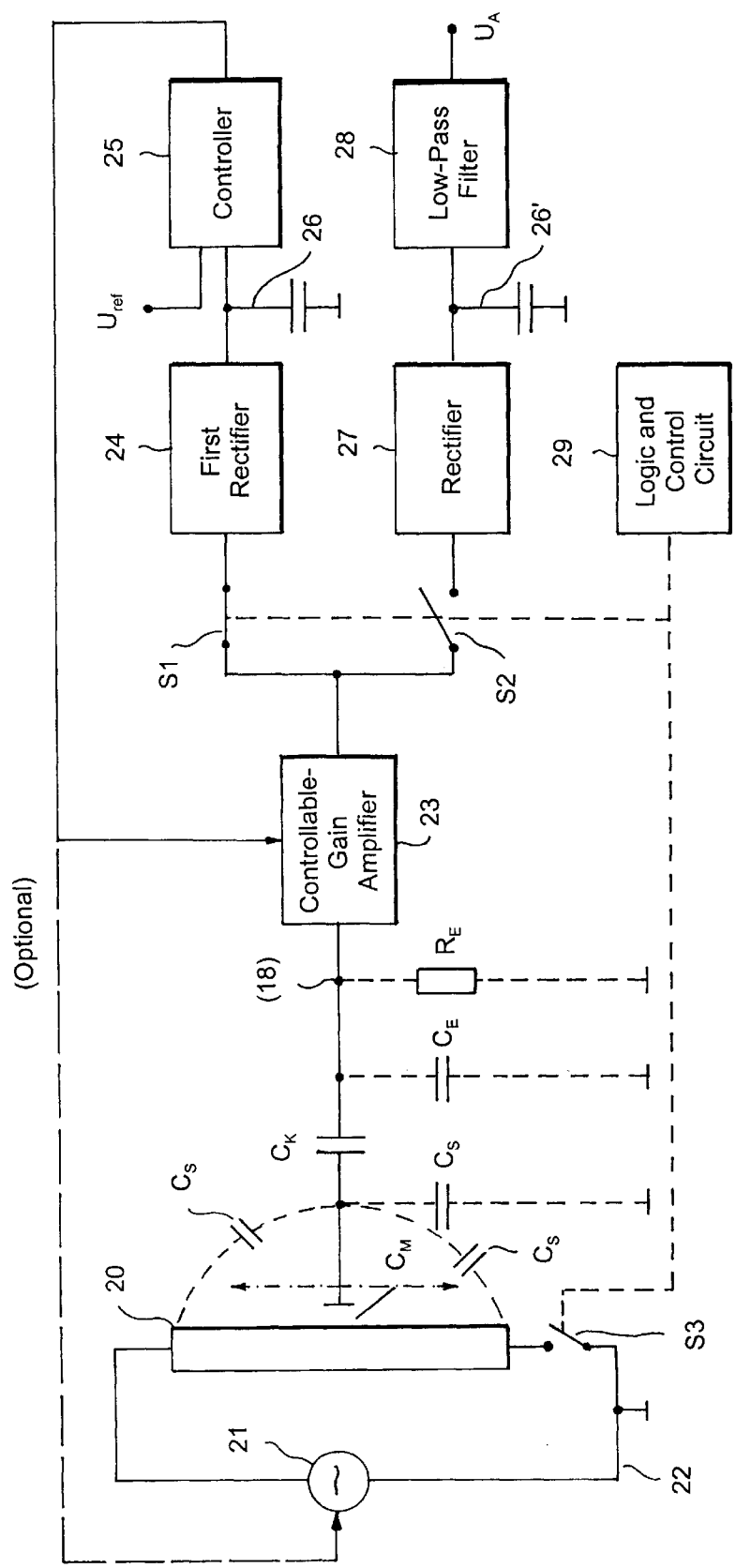
FIG. 4 shows a representation of one embodiment of the invention, in the form of a block diagram, where the entire working cycle is subdivided by suitable voltage control of the resistance path into a comparison and balancing Phase I and a measuring phase II.

A first embodiment of one evaluation circuit is illustrated in FIG. 4. The resistance path 20 is connected to an alternating voltage supply source 21 which has one end connected to ground at 22. The potential measuring probe forms together with the respective associated part of the resistance path 20 a first measuring capacitor $C_M$ connected in series with the coupling capacitor $C_K$. The circuit diagram of FIG. 4 further shows stray capacitors $C_s$ connected to ground and the resistance path, respectively, or other supply lines, together with an input capacitor $C_g$ and an input resistor $R_E$ at the input of a controllable-gain amplifier 23, all of which make themselves likewise felt as disturbance variables.

The output of the amplifier 23 is connected in parallel—via switches S1, S2, provided in push-pull arrangement, which may of course also take the form of electronic switches—to a first rectifier 24 whose output is connected to a controller 25 (for example an operational amplifier), the other input of which is supplied with a reference voltage $U_{ref}$. In addition, a storage capacitor 26 is provided at the input of the controller 25 for the intermediate storage of the rectifier output signal.

The output of the controller 25 is connected to the controllable-gain amplifier 23 and may optionally also act (alone or in combination with some action on the amplifier 23) on the alternating voltage supply source 21 so that the latter constitutes a signal source with controllable amplitude.

A parallel output branch of the amplifier 23 also comprises a rectifier 27, connected in series with a low-pass filter 28, if desired, to whose output the measuring signal ($U_A$) is applied; the switches S1 and S2 are synchronously connected to a switch S3 connected into the supply line to the resistance path 20 in a manner such that the switching conditions illustrated in FIG. 4 alternate, which means that the switch S3 is open every time the switch S1 is closed, and vice versa; the switch S2, which connects the measured-value processing elements to the output of the amplifier 23, is closed when the alternating supply voltage is supplied also to the resistance path 20, with the switch S3 in the closed and the switch S1 in the open condition, so that no amplification variations or variations in the amplitude of the supply voltage occur at that point in time or during that working phase.

The basic function of such a circuit arrangement, which is capable of being varied in a plurality of ways, is then as follows: During a first phase, when the switch S3 is open, the switch S2 is open, too, while the switch S1 is closed—the respective activation of the switches being taken care of by the logic and control circuit 29 —, the voltage divider is supplied by the alternating voltage supply source 21 in such a way that both ends exhibit the same potential, since with the switch S3 in its open condition no voltage drop occurs across the resistance path, irrespective of the position occupied at that time by the potential measuring probe. Consequently, the potential measuring probe senses the same potential at each position, which after having being amplified by the amplifier 23 and rectified at the input of the controller 25—the latter being preferably an I controller—is then compared with the reference voltage $U_{ref}$. The I controller 25 then re-adjusts the gain of the amplifier 23 (or influences the amplitude of the alternating voltage supply source 21, which is controllable in this case) to ensure that an output voltage corresponding to the reference voltage $U_{ref}$ appears at the output of the rectifier 24, during the comparison phase during which the output voltage of the measuring probe is independent of the latter's position. At the same time, this signal sensed by the potential measuring probe is during the comparison phase provides a measure of the transmission from the resistance path 20 to the measuring probe and, generally, for the transmission ratio achieved by the evaluation circuit. However, since the operation of the system is linear, this transmission ratio also applies to partial voltages, i.e. at times when the resistance path 20 effectively operates as a voltage divider.

This is the case during the measuring phase II, when the switch S3 is closed and, accordingly, the potential measuring probe senses an alternating voltage amplitude signal corresponding to its particular position, so that the described switching-over action, and action on the properties of the amplifier 23 and/or the amplitude of the supply source 21, has the effect to eliminate all influences due to disturbance variables.

During the measuring phase the derived signal is rectified by the rectifier 27, with the switch S2 closed, and transmitted via a low-pass filter 28 to the measuring output where due to the fact that the gain has been adjusted in such a way that a signal corresponding to the reference voltage $U_{ref}$ will appear under full voltage conditions, the signal appearing is proportional to the voltage divider ratio, i.e. representative of the position of the measuring probe.

Figure 5:
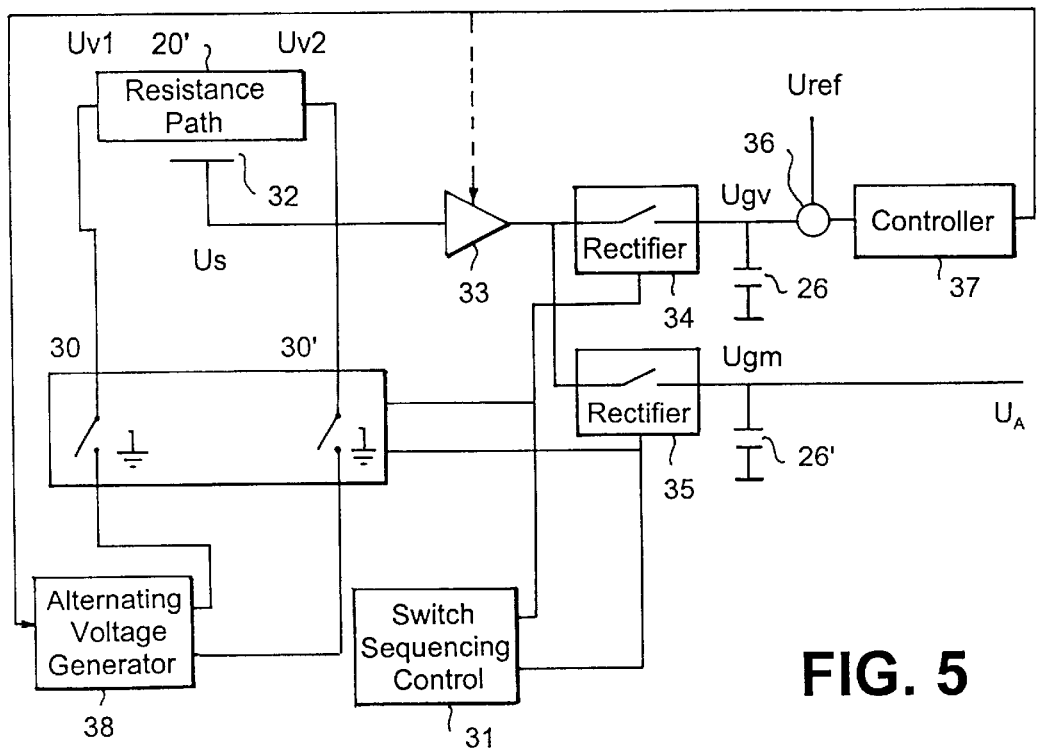
FIG. 5 shows a block diagram of another embodiment of the invention where either both ends of the resistance path are connected to the same voltage, or only one end is connected to voltage, by means of switches that are actuated in accordance with a predetermined timing code.

The basic principle explained in connection with FIG. 4, i.e. the subdivision of the measuring process into a comparison and/or balancing phase and a measuring phase can be implemented in a plurality of different embodiments. In the case of the embodiment illustrated in FIG. 5, both connected ends of the resistance path are supplied with alternating voltages Uv1 and Uv2, respectively, via switches 30, 30', the latter being controlled by a switch sequencing control 31 in such a way that either both terminal ends of the resistance path 20' are supplied with the same voltage, which means that Uv1=Uv2, so that no voltage drop occurs, while during the following (measuring) phase the voltage is applied only to one end of the resistance path 20', while the other end is connected to ground by the switch control so that a voltage drop occurs across the voltage divider path, or else—which is in fact the same thing—a voltage is applied to the other end in phase opposition to the voltage applied to the one end so that in this case, too, a voltage drop occurs across the voltage divider path.

During the first comparison phase I, when no voltage drop occurs, the probe voltage Us sensed by the probe 33 is transmitted, after having been amplified by the (controllable) amplifier 32 and rectified by the synchronous rectifier 34, reaches the summation point 36 as direct voltage Ugv, at which point the difference to the reference voltage $U_{ref}$ supplied is derived. The differential direct voltage is then transmitted to the subsequent controller 37, whose output is either applied—as mentioned before—to the input of the amplifier 33, for adjusting its gain, or is used—alternatively—for adjusting the amplitudes of the voltages Uv1 and Uv2 supplied by the alternating voltage generator 38.

Here again, the measured output voltage $U_A$, representative of the particular position of the probe, is transmitted during the measuring phase to the measuring output via the synchronous rectifier 35. Given the fact that the gain and/or the supply voltages of the potentiometer path had been adjusted during the comparison phase in such a way that a signal corresponding to the reference voltage appears under full voltage conditions, the output voltage $U_A$ will be proportional to the voltage divider ratio and the reference voltage.

Figure 6:
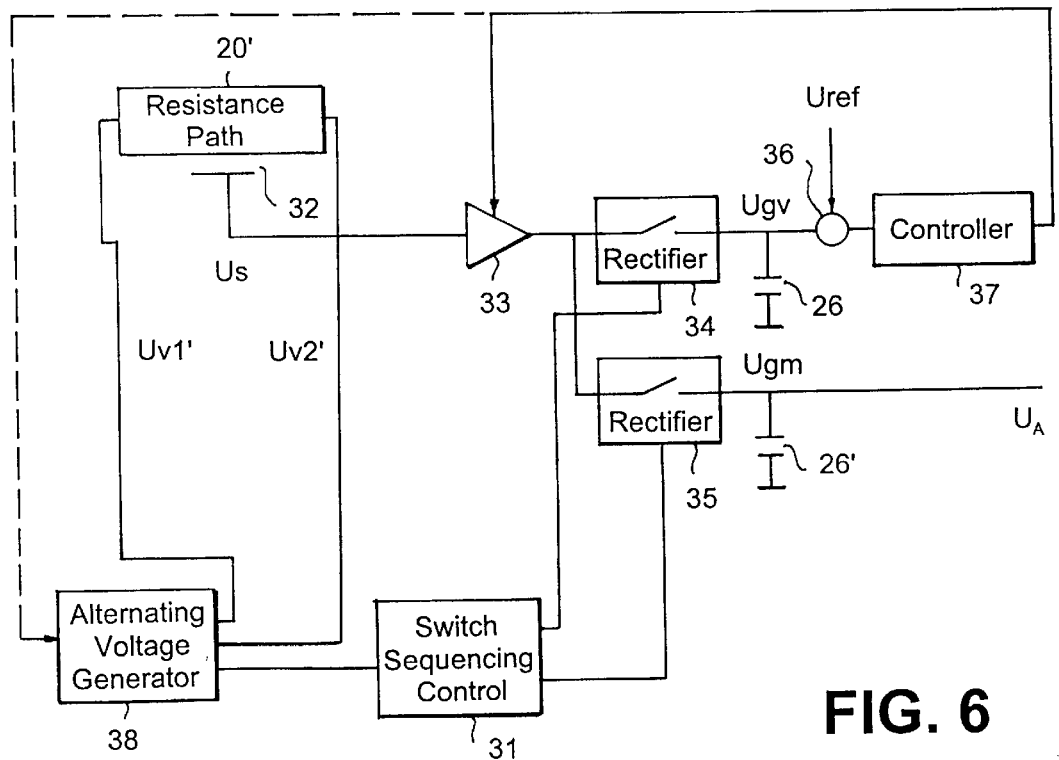
FIG. 6 shows a block diagram of another embodiment of the invention, where the resistance path is connected to a phase-shifted supply voltage.
Figure 7:
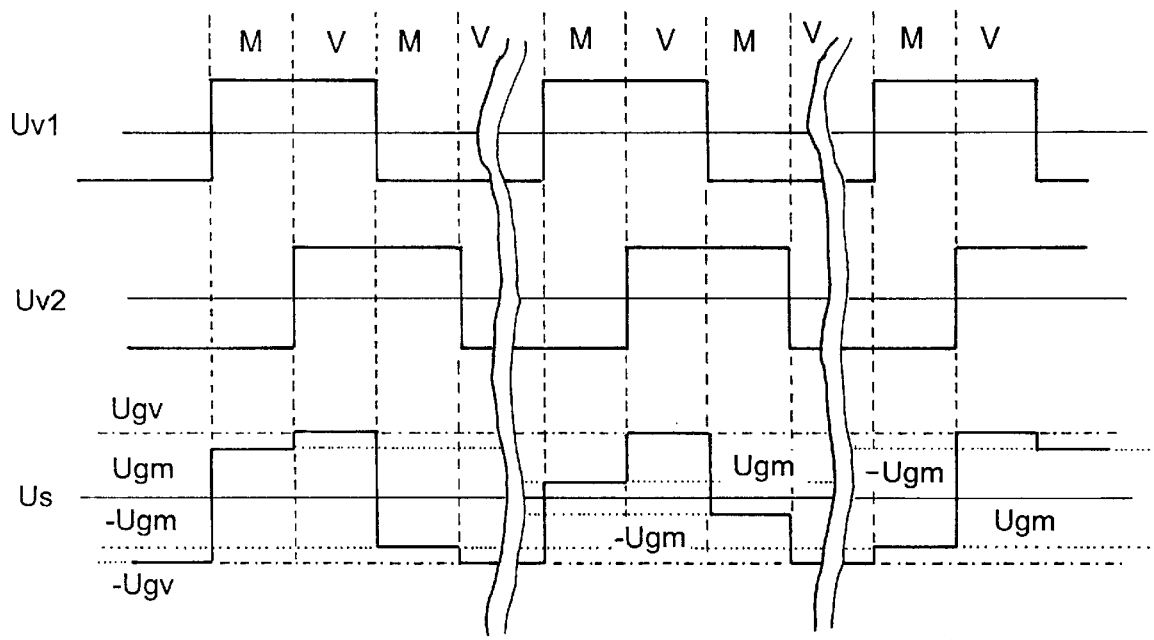
FIG. 7 shows a voltage/time diagram relating to the circuit of FIG. 6.

According to the circuit arrangement illustrated in FIG. 6 it is also possible to use phase-shifted supply voltages for the resistance path 20', in which case the potential gradients obtained at the different points of the circuit will be as reflected by the diagram of FIG. 7. In the representation of FIG. 6 and the following Figures the same reference numerals have been used to identify circuitry components identical to those appearing in FIG. 5, whereas an apostrophe has been added to the reference numerals of components with slightly different function.

Due to the shift in phase of the two supply voltages Uv1' and Uv2' generated by the alternating-voltage generator 38, the resistance path 20' is supplied with voltages of alternately the same and opposite phase, the voltage Uv2' lagging behind the voltage Uv1' by one fourth of a period. Consequently, during the periods of time designated by V, the two supply voltages have the same, either positive or negative, direction while during the periods of time designated by M they are in phase opposition. Consequently, no voltage drop occurs at the voltage divider during the "equal phase" periods V, and the electronic switch and the rectifier 34 produce during that period the reference voltage Ugv which corresponds to the potential probe voltage Us during that time. During the periods of time M, the opposite-phase supply voltages produce a voltage drop across the resistance path 20', which is used for determining the "voltage divider ratio", i.e. the position of the potential probe (measuring phase II). The measuring voltage Ugm is likewise produced by means of the electronically controlled circuit and rectifier 35, the two values Ugv and Ugm being stored in corresponding circuits that are implemented in the form of capacitors 26, 26'. The diagram of FIG. 7 reflects the potential curves for three different potential probe positions, namely one near the connection for a supply voltage Uv1, one approximately at the middle of the resistance path, and one near the end of the voltage supply point for Uv2.

It goes without saying that similar relationships are obtained when the voltage divider or a voltage divider element used with similar effect is supplied with square signals at both connections, in which case one end may be supplied, for example, with a square voltage of a given frequency, while the other end is supplied with a square voltage of twice that frequency. In this case, too, there will be equal-phase and opposite-phase periods of time that may be used as measuring phases and as reference phases, respectively.

Figure 8:
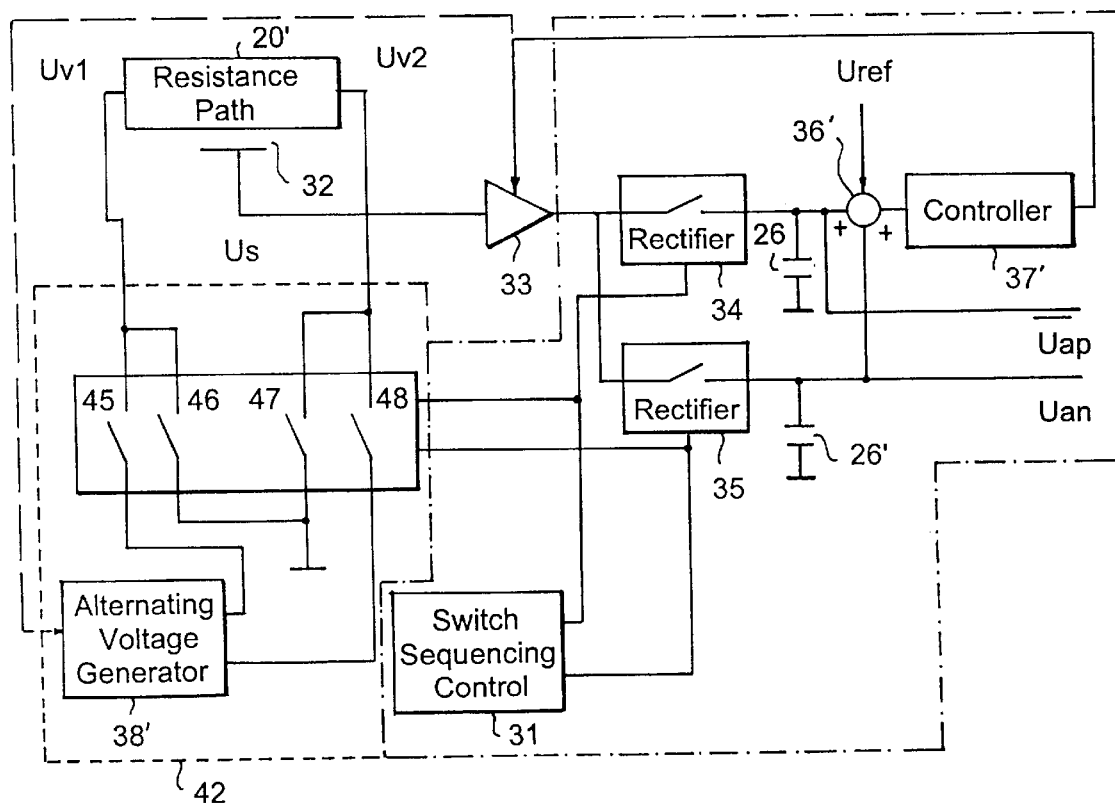
FIG. 8 shows a block diagram of one embodiment of the invention where the resistance path is supplied with oppositely directed alternating voltages, with FIG. 9 illustrating the two characteristic curves and their cumulative curve.
Figure 9:
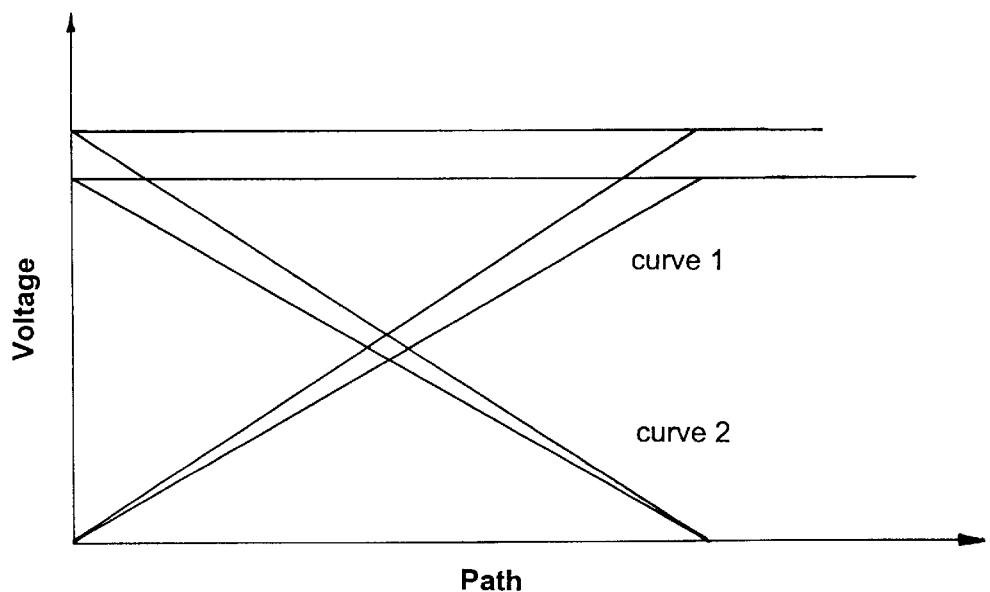

Another way to implement the system is that represented by FIG. 8, where the resistance path 20' of the voltage divider element is supplied with alternating supply voltages in phase opposition, which means in other words that a rising and a dropping characteristic is produced, as represented in FIG. 9, by changing the polarity of the potentiometer path. In this case (see FIG. 8) the alternating voltage source 38' supplies alternating supply voltages Uv1 and Uv2 of equal amplitude, that are alternately applied to the ends of the resistance path 20' via first electronic switches 45 and 48, while at any time the respective other end of the resistance path 20' is connected to ground via further electronic switches 46 and 47. Consequently, the switches 45 and 47 are activated in combination with the controlled amplifier circuit 35, while alternately, during a next phase, the switches 46 and 48 are activated in combination with the controlled rectifier circuit 34—although no separate comparison and measuring phases exist in the case of this embodiment of the invention The output signals of the two rectifiers 34 and 35, which are controlled in synchronization with the switches 45 to 48, are intermediately stored in the capacitors 26 and 26', and are then transmitted via a summing element 36' to the controller circuit 37' which is configured as I controller preferably to control, here again, the input amplitude of the supply voltages Uv1, Uv2 to the resistance potentiometer path in such a way that the sum of the two output voltages determined remains constant, i.e. that—according to the representation of FIG. 9—the voltage sum is, for example, adjusted to a higher value by comparison with a constant value, as the sum of the two characteristic curves 1 and 2 must have a constant value at any position of the path. In the case of the embodiment of FIG. 8, this can again be achieved by effecting a comparison with a reference voltage $U_{ref}$ supplied to the summing element 36'. The controller 37 then ensures that the sum of the two output signals is equal to the reference voltage $U_{ref}$, either by adjustment of the gain of the amplifier 33 or by corresponding re-adjustment of the amplitude of the supply voltage for the potentiometer, as indicated by the dashed connection line between the output of the I controller 37' and the input of the alternating-current generator 38'.

Such a control also has the effect to eliminate the influence of any disturbance variables due to the properties of the coupling capacitors, it being possible in this case to use the signal of either the one or the other characteristic, i.e. Uan or Uap, as output voltage.

It has been found to be desirable in the case of such a capacitance-based displacement sensor, angle or position sensor that the voltage source supplying the voltage divider, and the amplifier input for the output voltage should have a defined potential reference point as otherwise the measurement may become dependent on the potential ratio in the supply voltage and of the sensor housing. It is, therefore, desirable that the ground potential of the supply voltage be connected to the sensor housing, at least for the frequency range used, as otherwise undefined conditions may arise in which case measuring errors cannot be excluded.

Since, on the other hand, it is not always possible in electric systems to connect the housing to the ground potential of the supply voltage, certain developments of the invention propose convenient ways for eliminating any disturbances that may arise due to imperfect separation of the potential ratios.

Figure 10:
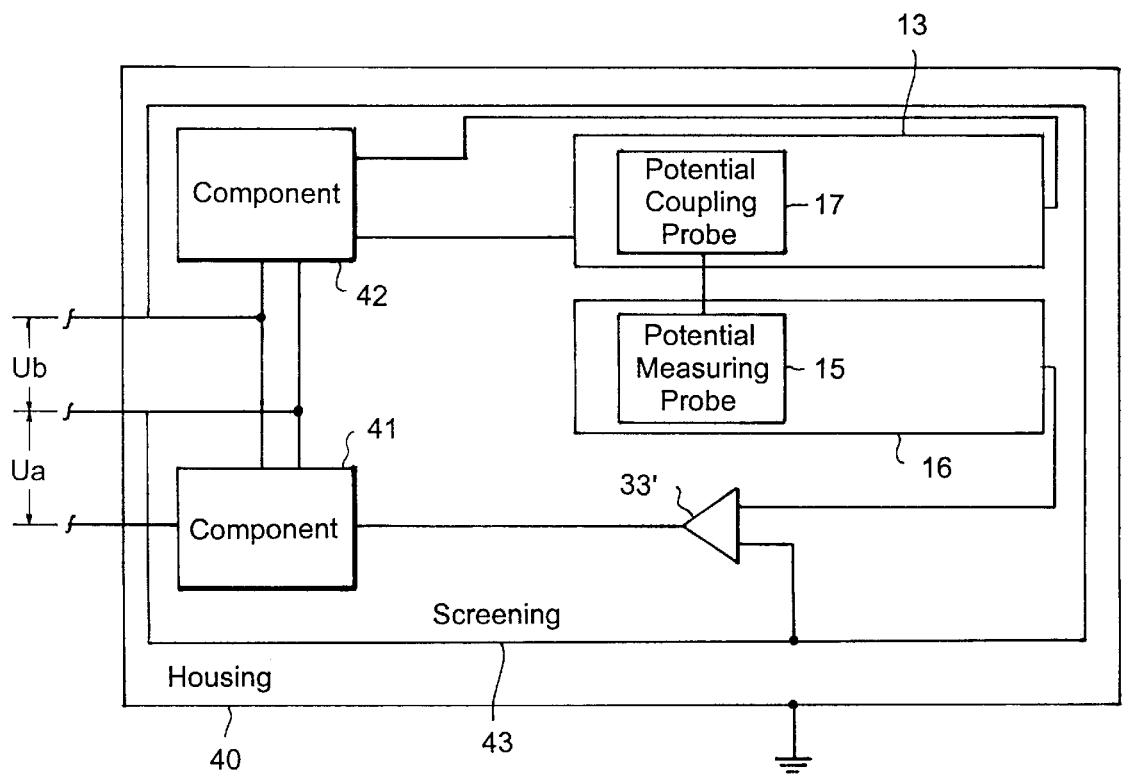
FIGS. 10 and 11 finally show two different approaches for the possible screening and electric isolation of certain specific circuitry components.

According to the representation of FIG. 10, a first variant comprises an insulated screening housing, and the voltage divider element, the measuring probe and the feedback electrode or coupling electrode are enclosed by a screening that serves as ground potential.

The diagram of FIG. 10 shows the voltage divider element 13 as potentiometer resistance path, the coupling electrode 16 with the common element consisting of the potential measuring probe 17 and the potential coupling probe 15, the amplifier 33', and a component 41 comprising those components that are shown by dash-dotted lines in FIG. 8, and further a component 42 comprising the components that are surrounded by dashed lines in FIG. 8.

In the case of such a sensor with insulated screening housing it is of decisive importance that no coupling is effected from the housing 40 of the sensor to the potential measuring/coupling probe 17, 15 and to the connection to the amplifier 33'. In addition, it must be prevented that alternating voltages applied to the resistance path 13 and to the supply lines from the alternating voltage source 42 are coupled into the housing. To this end, a screening 43 is provided in insulated arrangement in the housing 40 and connected to the reference potential, for example to the negative supply voltage connection. Conveniently, the entire electronic system, but at least that part in which alternating voltages occur, should be arranged inside this screening 43.

Such a solution can be implemented comparatively easily under electric aspects, but may lead to additional costs, due to the space requirements, and to constructional difficulties especially where little space is available.

Figure 11:
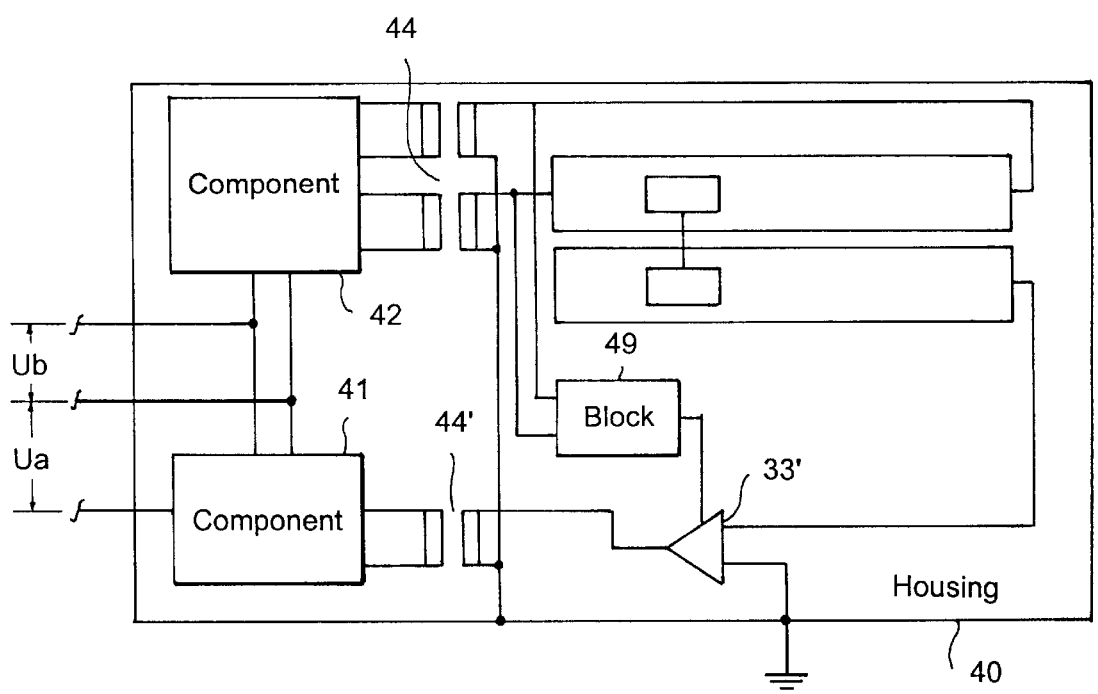

Another approach, illustrated in FIG. 11—components identical to those used in FIG. 10 are designated by the same reference numerals—, therefore consists in isolating the voltage divider, the preliminary amplifier and the supply voltage electrically, for example by providing isolating transformers 44, 44' which galvanically isolate the voltage divider elements and the amplifier as well as the probe signal. It is a further advantage in this case if the voltage divider is supplied by means of one or more transformers so that the supply voltage for the amplifier 33' of the probe signal can be generated also via the additional block 49.

In the case of this solution, the sensor housing can be used as ground potential and screening, and in addition such a structure is also more favorable under electromagnetic compatability aspects, providing at the same time for a simpler structure.

While the different aspects of the invention have been discussed with reference to block diagrams, it is important to note that certain parts, or even larger circuit units, may of course be implemented by means of components of a type commonly in use today, especially microprocessors, or the like. Thus, the invention is not limited to the discreet circuit steps and/or circuit blocks shown; rather, the latter have been described especially for the purpose of illustrating the basic functions and effects of the invention and certain special functional sequences. It goes without saying that the different components and blocks may be of the analogue, digital or of hybrid kind, or may be implemented as fully or partially integrated units comprising corresponding portions of program-controlled digital systems, such as microprocessors, small computers, digital or analogue logic circuits, or the like. The description of the invention provided above should, therefore, be understood as a description of a preferred embodiment meant to explain the functional and timing sequences and the operation of the respective blocks discussed, it being understood that the different components so discussed may also be replaced by other ones providing the same effect.

Another aspect of the present invention is the necessity to monitor certain parts of the circuit or the overall function in order to avoid that any failure of the sensor, that may remain unnoticed, may cause greater damage. It would, therefore, be convenient to provide a higher-level circuit, preferably one designed as a microprocessor having a plurality of inputs, that may be connected to different circuit points of the respective embodiments discussed in connection with the Figures, and that initiates an alarm or some other measure when certain predetermined threshold values are exceeded in upward or downward direction.

In addition to failures of the electronic systems, breakage of the supply line to the sensor, short-circuits of the sensor connections, short-circuits of the measuring electrode and the output voltage have to be considered as possible failure conditions.

In addition to monitoring the output voltage to ensure that it remains within plausible limits, the proper function of the system can be actively verified by other circuit details, namely:

Monitoring the operational gain for the re-adjustment of the reference voltage;

In addition, to ensure the proper function of the sensor, a minimum and a maximum output signal of a measuring probe must appear so that the control voltage (if a controllable amplifier is provided) or supply voltage for the voltage divider can be monitored;

Monitoring the reference comparison, for example by varying the rectification by means of control inputs in such a way that, as long as the system functions properly, the reference voltage appears at the output;

Monitoring the reference potential, for example by controlling the rectification in such a way that a potential near the reference potential appears at the output;

Monitoring the opposite-phase output voltage; here again, the rectification may be controlled in such a way that the output voltage assumes a value as if the two connections of the voltage divider had been exchanged.

As mentioned before, all these features can be implemented with little cost by means of correspondingly programmed microprocessors or small computers.

Finally, it should be noted that the claims and, in particular, the main claim constitute attempts at formulating the invention, without a profound knowledge of the state of the art, and that, therefore, they may not be interpreted as having a prejudicial effect. Consequently, it is understood that all features described and illustrated in the specification, the claims and the drawings are essential to the invention and may be incorporated in the claims individually or in any combination.

We claim:

1. A method for determining the geometrical position, displacement, or angle of a measuring probe by capacitive sensing, comprising the steps of:

guiding the measuring probe along and in spaced relation to a voltage distribution element to a position between first and second ends of the voltage distribution element, the voltage distribution element being connectable to a source of alternating voltage and the measuring probe being capacitively coupled to the voltage distribution element to sense a voltage therebetween;

during a comparison phase in which there is no voltage drop across the voltage distribution element between the first and second ends, comparing the magnitude of a sensed voltage from the measuring probe with the magnitude of a reference voltage value;

during the comparison phase, controlling the magnitude of one of the source of alternating voltage and a controllable gain amplifier to make the magnitude of the sensed voltage equal to the magnitude of the reference voltage value;

thereafter, during a measurement phase in which there is a voltage drop across the voltage distribution element between the first and second ends, sensing a voltage from the measuring probe which corresponds to the position of the probe between the first and second ends of the voltage distribution element, the voltage being obtained free of disturbance variables.

2. The method according to claim 1, wherein, during the comparison phase, the source of alternating voltage supplies the voltage distribution element with an alternating voltage which is equal at each of the first and second ends so that there is no voltage drop between the first and second ends.

3. The method according to claim 1, wherein, during the measurement phase, the source of alternating voltages is applied to only a first end of the voltage distribution element while the second end is connected to ground.

4. The method according to claim 1, wherein, during the measurement phase, opposite-phase voltages from the source of alternating voltage are applied to the first and second ends of the voltage distribution element.

5. The method according to claim 1, including the additional step of switching between the comparison phase and the measurement phase.

6. The method according to claim 1, wherein the measuring probe is connected to a coupling probe to form a single physical unit, the two probes traveling the same measuring path and the coupling probe being capacitively coupled to a stationary coupling electrode to which a measured value is delivered.

* * * * *